United States Patent
Baik et al.

(10) Patent No.: US 8,780,740 B2
(45) Date of Patent: Jul. 15, 2014

(54) SYSTEM AND METHOD FOR CONTROLLING DOWNLINK PACKET LATENCY

(75) Inventors: Eugene J. Baik, San Diego, CA (US); Jason F. Hunzinger, San Diego, CA (US); Vinay Chande, San Diego, CA (US); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 12/774,874

(22) Filed: May 6, 2010

(65) Prior Publication Data

US 2011/0274053 A1 Nov. 10, 2011

(51) Int. Cl.
*H04L 12/26* (2006.01)

(52) U.S. Cl.
USPC .............................. 370/252; 370/230; 370/516

(58) Field of Classification Search
USPC ............ 370/252, 230, 235, 238, 352, 395.21, 370/516, 517, 519
See application file for complete search history.

(56) References Cited

U.S. PATENT DOCUMENTS

| | | | | |
|---|---|---|---|---|
| 6,947,750 | B2* | 9/2005 | Kakani et al. | 455/452.2 |
| 7,515,583 | B2* | 4/2009 | Kamani et al. | 370/352 |
| 2003/0099249 | A1 | 5/2003 | Heijenk | |
| 2004/0240390 | A1* | 12/2004 | Seckin | 370/252 |
| 2006/0007878 | A1* | 1/2006 | Xu et al. | 370/328 |
| 2007/0025264 | A1* | 2/2007 | Cheng et al. | 370/252 |
| 2008/0008203 | A1* | 1/2008 | Frankkila et al. | 370/412 |
| 2008/0043643 | A1* | 2/2008 | Thielman et al. | 370/260 |
| 2008/0112344 | A1 | 5/2008 | Oleszczuk | |
| 2008/0117891 | A1* | 5/2008 | Damnjanovic et al. | 370/345 |
| 2008/0215948 | A1* | 9/2008 | Pinheiro et al. | 714/748 |
| 2008/0267069 | A1* | 10/2008 | Thielman et al. | 370/235 |
| 2008/0316928 | A1 | 12/2008 | Yuan et al. | |
| 2009/0129375 | A1* | 5/2009 | Mohanty et al. | 370/356 |
| 2009/0137240 | A1* | 5/2009 | Dillon et al. | 455/423 |
| 2009/0213871 | A1* | 8/2009 | Carlson et al. | 370/462 |
| 2010/0185911 | A1* | 7/2010 | Cheng | 714/751 |
| 2011/0004797 | A1* | 1/2011 | Gerstenberger et al. | 714/748 |
| 2011/0007638 | A1* | 1/2011 | Xu et al. | 370/252 |
| 2011/0243000 | A1* | 10/2011 | Nagaraja | 370/252 |
| 2013/0095748 | A1* | 4/2013 | Hu et al. | 455/8 |

OTHER PUBLICATIONS

International Search Report and Written Opinion—PCT/US2011/035637—ISA EPO—Aug. 9, 2011.
Jani Puttonen et al: "Mixed traffic packet scheduling in UTRAN Long Term Evolution Downlink", Sep. 15, 2008, Personal, Indoor and Mobile Radio Communications, 2008. PIMRC 2008. IEEE 19TH International Symposium on, IEEE, Piscataway, NJ, USA, pp. 1-5, XP031371465, ISBN: 978-1-4244-2643-0 the whole document.

* cited by examiner

*Primary Examiner* — Kwang B Yao
*Assistant Examiner* — Nguyen Ngo (57) ABSTRACT

A method, an apparatus, and a computer program product for wireless communication are provided in which VoIP traffic is scheduled in a way that focuses on controlling user latencies, by reshaping packet latency profiles of individual users to more efficiently utilize power/code resources. A feedback mechanism may utilize certain latency controllers to adjust a queuing delay and an over-the-air transmit time to meet latency targets. That is, system resources may be allocated in a wireless network by adjusting a latency target for a packet responsive to a user's packet latency history.

55 Claims, 9 Drawing Sheets

SYSTEM AND METHOD FOR CONTROLLING DOWNLINK PACKET LATENCY

BACKGROUND

1. Field

The present disclosure relates generally to communication systems, and more particularly, to schedulers for allocating system resources to data packets in communication networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Some examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Universal Mobile Telecommunications System (UMTS).

The original UMTS system was designed mainly to transport delay-sensitive voice traffic over dedicated uplink and downlink channels. That is, voice calls are circuit switched, and each call is assigned dedicated traffic and control channels to handle the delay-sensitive voice traffic. Because system resources are statically allocated to users in calls, MAC layer scheduling algorithms for dynamic code and power assignment were not necessary in these systems.

Following the standardization of High Speed Packet Access (HSPA) Release 6 and Release 7, operators have had the capability to transport voice call traffic over packet switched HS-channels. These schemes are classified as Voice-over-IP (VoIP). Migrating call traffic to VoIP is of interest to operators because it can better streamline system resource management and also open possibilities for increasing voice call capacity within the system. However, to achieve these benefits, more sophisticated traffic scheduling algorithms are desired to ensure that users are scheduled and reliably served over HSPA's modified PHY and MAC layers.

In a VoIP system, there exists an end-to-end latency. This end-to-end latency includes delays during processing at the handset, upper-layer delays during processing at the base station, and other delays related to the Internet, or on the uplink, etc. The instant disclosure generally relates to latency on the downlink, that is, the time required for packets to get from the base station to the handset. The maximum latency requirement is generally related to a desired level of quality. For example, in a voice call, an end-to-end latency of greater than about 250 ms would result in unacceptable quality. For latency on the downlink, one may assume that a maximum latency of 100 ms will result in acceptable call quality for VoIP. Downlink latency generally includes the scheduling of vocoder packets and over the air transmission of those packets.

At a high-level, VoIP scheduling can be viewed as a queuing system, where each user in the system has a queue that is filled with data packets (at some arrival rate) to be served and where the scheduler at the MAC-hs level has a limited number of servers to process those waiting users. Here, specific reference is made to the MAC protocol defined in 3GPP TS 25.321, "MAC Protocol Specification," however, other MAC-layer protocols may be utilized.

At each scheduling instance (e.g., every 2 ms transmission time interval (TTI) in HSDPA), the MAC-hs scheduler determines which users' packets to schedule and how to transport those packets. Prior implementations of downlink VoIP schedulers have experimented with different metrics for determining users' scheduling priority and with different power/code allocation strategies. The general procedure for VoIP scheduling has been to take the following three steps at each scheduling instance:

1. Among users with traffic to be transmitted (i.e. non-empty queues), calculate priority metrics based on some weighting of the user's channel conditions, queue length, etc.
2. Rank the users according to their respective priority metric.
3. Allocate system resources (e.g. OVSF codes and Ec/Ior power for the HS-DSCH) according to priority rank until there are no more users' packets to schedule or no remaining system resources.

One metric of interest for VoIP scheduling performance is the system capacity. System capacity relates to the maximum number of callers supportable in a system, given the latency and quality-of-service criteria of voice traffic. A widely accepted definition of system capacity is the maximum number of users a system can service when, on average, no more than 5% of the users in each cell fail certain specified call quality criteria. In a VoIP system, these call quality criteria may include a requirement for less than 100 ms latency for each VoIP call packet (i.e., block). When a system reaches its VoIP capacity, this generally means that the scheduler has run out of OVSF codes, Ec/Ior power, HS-SCCH codes, or some combination thereof, and thus can no longer maintain the systemwide VoIP call quality criteria.

When a wireless VoIP user enters an area with poor signal conditions, their packet queue at the base station frequently accumulates a large backlog because their queue cannot clear quickly enough. This creates a bottleneck for VoIP capacity, caused by users failing to meet their latency requirements because of backlogged packets timing out in their queues. Many conventional scheduling algorithms exacerbate the situation by inefficiently using the system's limited scheduling resources. For these and other reasons, there is a need in the art for an improved scheduling system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, VoIP traffic is scheduled in a way that focuses on controlling user latencies, by reshaping packet latency profiles of individual users to more efficiently utilize power/code resources. A feedback mechanism may utilize certain tuning knobs or latency controllers to adjust, control, or regulate a queuing delay and/or an over-the-air transmit time to meet latency targets.

That is, in an aspect of this disclosure, a method for allocating system resources in a wireless network includes adjusting a latency target for a packet responsive to a user's packet latency history.

In another aspect of the disclosure, an apparatus for wireless communication includes means for allocating resources for packet transmissions and for determining latency of transmitted packets, and means for adjusting a latency target for a packet responsive to a user's packet latency history.

In yet another aspect of the disclosure, a computer-readable medium includes code for adjusting a latency target for a packet responsive to a user's packet latency history.

In yet another aspect of the disclosure, a processing system is configured to adjust a latency target for a packet responsive to a user's packet latency history.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As used herein, a phrase referring to "at least one of" a list of items refers to any combination of those items, including single members. As an example, "at least one of: a, b, or c" is intended to cover: a, b, c, a-b, a-c, b-c, and a-b-c.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are is implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 1:
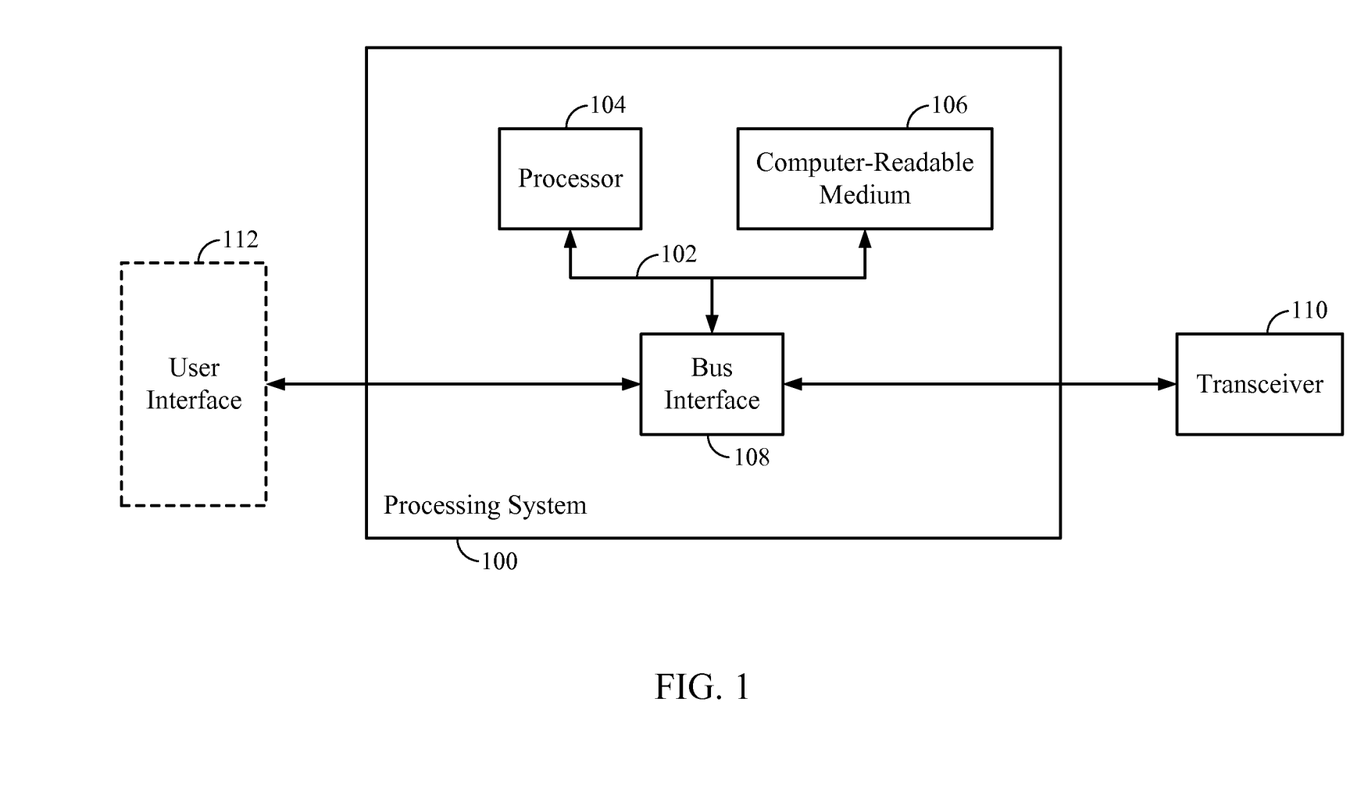
FIG. 1 is a conceptual diagram illustrating an example of a hardware implementation for an apparatus employing a processing system.

FIG. 1 is a conceptual diagram illustrating an example of a hardware implementation for an apparatus employing a processing system. In this example, the processing system 100 may be implemented with a bus architecture, represented generally by bus 102. The bus 102 may include any number of interconnecting buses and bridges depending on the specific application of the processing system 100 and the overall design constraints. The bus links together various circuits including one or more processors, represented generally by processor 104, and computer-readable media, represented generally by computer-readable medium 106. The bus 102 may also link various other circuits such as timing sources, peripherals, voltage regulators, power management circuits, and the like, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick, etc.) may also be provided.

The processor 104 is responsible for managing the bus and general processing, including the execution of software stored on the computer-readable medium 106. The software, when executed by the processor 104, cause the processing system 100 to perform the various functions described below for any particular apparatus. The computer-readable medium 106 may also be used for storing data that is manipulated by the processor 104 when executing software.

Figure 2:
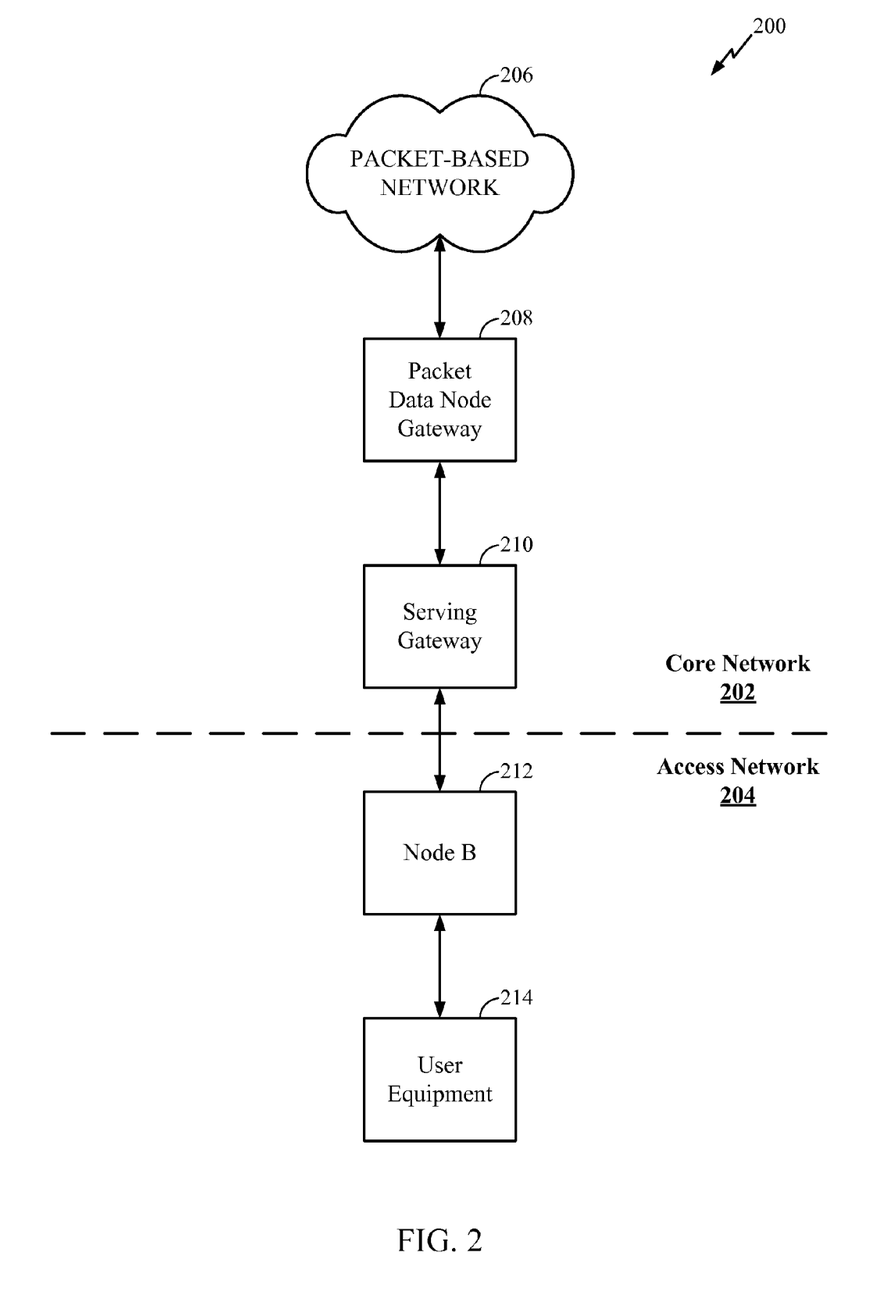
FIG. 2 is a conceptual diagram illustrating an example of a network architecture.

An example of a telecommunications system employing various apparatus will now be presented with reference to a UMTS network architecture as shown in FIG. 2. The UMTS network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as a Node B in UMTS applications, but may also be referred to by those skilled in the art as a base station, a base transceiver station, a radio base station, a radio transceiver, a transceiver function, a basic service set (BSS), an extended service set (ESS), or some other suitable terminology. The Node B 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide user equipment (UE) 214 with network connectivity. Data packets are transferred between the PDN gateway 208 and the UE 214 through the serving gateway 210, which serves as the local mobility anchor as the UE 214 roams through the access network 204.

Figure 3:
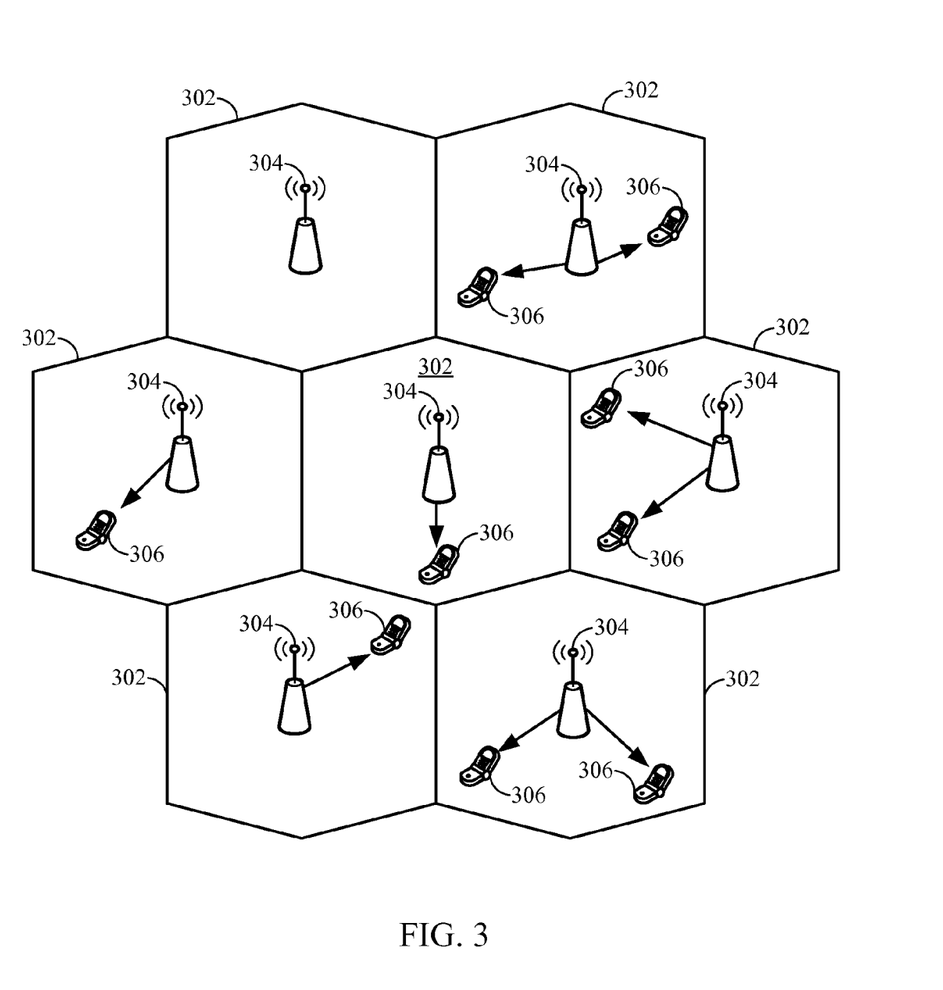
FIG. 3 is a conceptual diagram illustrating an example of an access network.

An example of an access network in a UMTS network architecture will now be presented with reference to FIG. 3. In this example, the access network 300 is divided into a number of cellular regions (cells) 302. A Node B 304 is assigned to a cell 302 and configured to provide an access point to a core network 202 (see FIG. 2) for all UEs 306 in the cell 302. There is no centralized controller in this example of an access network 300, but a centralized controller may be used in alternative configurations. The Node B 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In UMTS applications, direct sequence wideband code division multiple access (DS-WCDMA) is utilized to support both frequency division duplexing (FDD) and time division duplexing (TDD). As those skilled in the art will readily appreciate from the detailed description to follow, the various concepts presented herein are well suited for UMTS applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
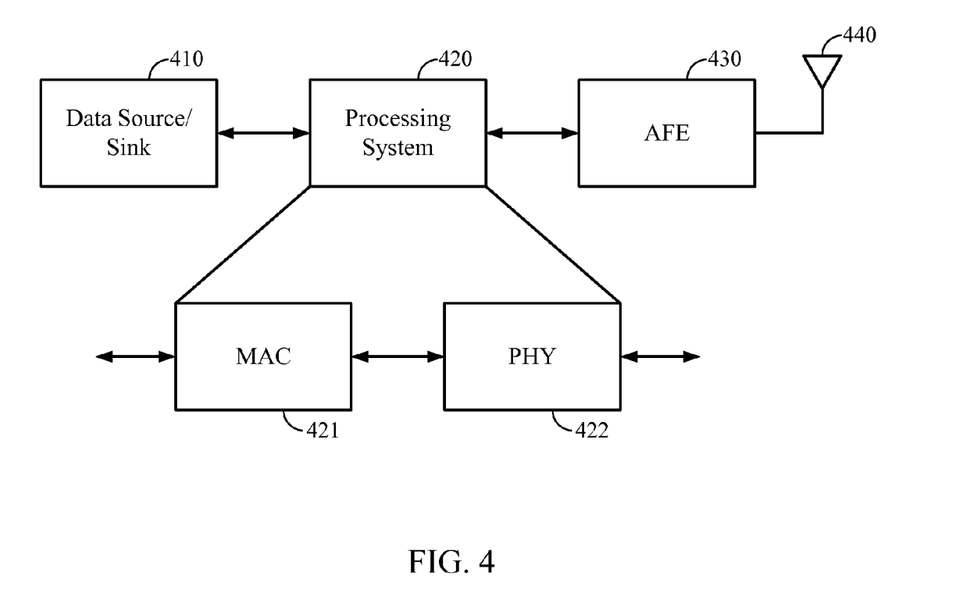
FIG. 4 is a block diagram illustrating a wireless communication apparatus.

FIG. 4 is a block diagram illustrating portions of a wireless communications apparatus according to an aspect of the instant disclosure. A data source/sink 410 may include the packet-based network 206 shown in FIG. 2, a host on the network, a public switched telephone network (PSTN), or another suitable network. Processing system 420 may include the system illustrated in FIG. 1. Analog front end (AFE) 430 may include at least one of a transmit chain, a receive chain, amplifier, filter, and other suitable components for executing RF communication over antenna 440.

In an aspect of this disclosure, the processing system 420 may be conceptualized as including a MAC unit 421 and a PHY unit 422. PHY 422 includes details of the processing system 420 such as electrical and mechanical connections, transmission of binary data as changing voltage levels on wires or similar concepts on other connectors, and data rates. In some aspects, MAC 421 interfaces with the PHY 422, and includes support for functions such as addressing and channel access control. In an aspect of the instant disclosure, MAC 421 includes a scheduler as illustrated in FIG. 5.

Figure 5:
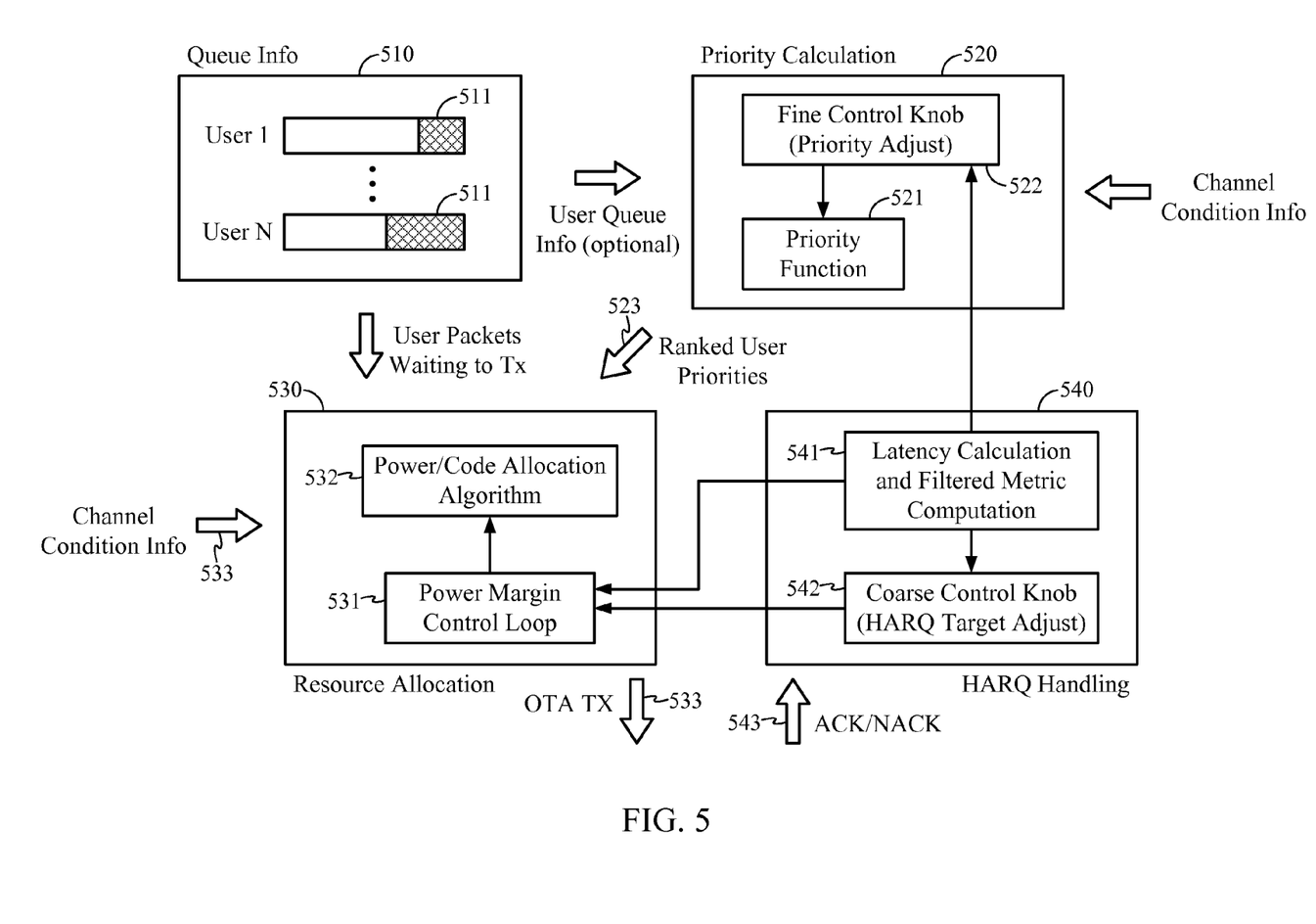
FIG. 5 is a block diagram illustrating a scheduler according to an aspect of the disclosure.

FIG. 5 is a block diagram illustrating portions of a scheduler enabling latency control according to one aspect of the instant disclosure. Block 510 includes memory units 511 for maintaining queues corresponding to users of the system and for providing temporary storage of data packets for the respective users from the network. Memory units 511 may include volatile memory units such as DRAM or SRAM, nonvolatile memory units such as magnetic hard drives or FLASH EEPROM, or any other suitable memory unit known to those skilled in the art.

Block 520 is a priority calculation unit for calculating a priority function 521 and applying the priority to a given user's packets. The priority applied to the user's packets results in a ranking 523 of users' packet priorities, which feeds into the resource allocation unit 530. In general, the priority of a packet may increase as the time that the packet has been in the queue increases. However, this priority may be adjusted by a fine controller 522.

Block 540 is a HARQ handling unit for handling Hybrid ARQ, described in more detail below. The HARQ handling unit 540 further includes a latency calculation and filtered metric computation block 541. The computation block 541 determines the latency of arrived packets, and calculates a statistic of the difference between the observed latency history and a latency target. Based on this calculation, the fine controller 522 and/or a coarse controller 542 may be utilized to adjust one or more parameters such as the user's scheduling priority or HARQ target, respectively, as discussed in further detail below.

Block 530 is a resource allocation unit for allocating system resources to the respective users. That is, the scheduler allocates resources to the queued packets according to their ranked user priorities from the priority calculation unit 520. When the resources are allocated to a particular packet, the power margin control loop 531 and the power/code allocation algorithm 532 determine the power and the signal format of the over-the-air signal 533 to be transmitted.

After the packet is transmitted over the air, user equipment responds with a HARQ ACK/NACK 543, received by the HARQ handling unit 540, which thereby determines the latency for that packet.

The timing of downlink latency generally begins at the time when the scheduler at the base station receives and enqueues a packet. The scheduler allocates system resources to queued packets according to various priority schemes. The packet is then sent out over the air. Many modern systems utilize a hybrid automatic repeat request (HARQ), which is a combined form of forward error correction and error detection schemes, wherein user equipment notifies the base station when the packet is received with or without errors, for example, by transmitting an acknowledgment or non-acknowledgment (ACK/NACK) signal. When the base station receives the ACK or otherwise when the attempted transmission is terminated, is the end time for determining downlink latency.

Different scheduling algorithms generally provide different system capacities, based on how optimally they are able to balance factors such as user prioritization and resource allocation, given the operating conditions of the users in the system. Recent simulation results of various scheduler implementations show that downlink VoIP capacity is generally limited by subsets of users in adverse channel conditions whose queues build up faster than they can be cleared. These users go into outage when the packets in their queues exceed their latency limits (i.e. time-out) while waiting to be served. Here, outage for a user means that the user is failing to meet some minimum call quality criteria. For example, the 3GPP-defined criteria for outage is when a user's packet error rate (PER) exceeds 3%, which includes packets in error due to latency timeouts.

When scheduling delay-sensitive traffic such as VoIP, the MAC-hs scheduler attempts to multiplex users into a shared channel such that each packet from any user's queue completes transmission before some allowable latency bound. For a user in a voice call, encoded voice packets (e.g., vocoder packets from an upper layer protocol) arrive in its queue and wait to be scheduled and transmitted. The user's queue competes with other users to be serviced by the scheduler, and the time that elapses until it is serviced (i.e. allocated resources for transmission over the air) is the queuing delay for that packet. The latency timeline for a single packet is illustrated in FIG. 6.

Figure 6:
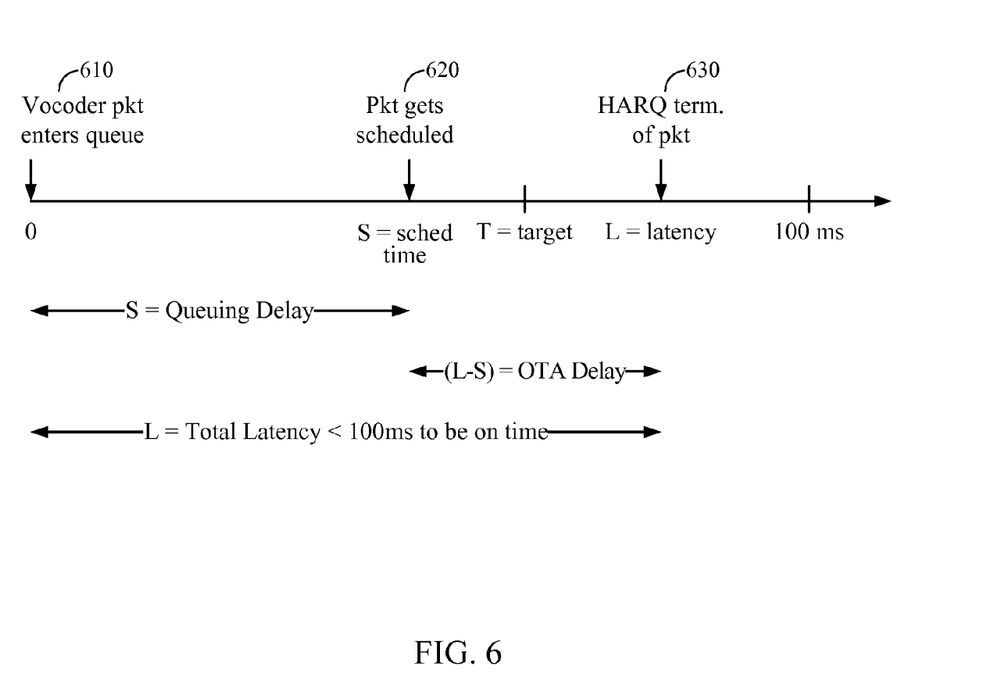
FIG. 6 is a time line illustrating packet latency.

As illustrated in FIG. 6, at time 610, a packet enters the queue, and at time 620, the packet in the queue gets scheduled, i.e., allocated resources for transmission. The time S between 610 and 620 is the queuing delay. Once a packet is scheduled, it may be sent over the air using a Hybrid ARQ (HARQ) for reliable transmission. The packet may either terminate after some number of transmissions or reach the maximum number of transmissions and be considered to be in error. At time 630, the base station may receive a HARQ acknowledgment (ACK) from the user equipment indicating that the packet was received successfully. The time (L−S) between the scheduling of the packet and the HARQ termination of the packet is the over-the-air (OTA) delay. The sum of the queuing delay S and the OTA delay (L−S) is the overall downlink latency L. For a VoIP packet to be considered successful, it should be received and terminated before an upper-layer defined latency bound. The 3GPP-defined criterion for maximum allowable VoIP packet latency bound in HSPA is 100 ms. Since the queuing delay and/or the OTA delay may vary, a packet's actual observed latency L may vary and may be less than, greater than (as shown in the FIG. 6 example), or equal to a latency target T for an individual packet. Because of such variations (e.g., randomness), the latency target T for an individual packet may generally be controlled to be less than or equal to the defined latency bound.

The distribution of the latency component variations (e.g., the queuing delay S and the OTA delay L−S) over a number of the user's packets, and shifts to the distribution by adjusting the latency controllers, determine the probability of exceeding the latency bound. Furthermore, the variations in the queuing delay and/or the OTA delay may differ between users and thus different targets may be applicable to different users for the scheduler to attempt to achieve. For example, a distribution may be shifted or shaped such that less than a specific percentage of packets are delayed beyond the bound. Here, even if this percentage is sought to be the same for all users, the average latency for each user may be quite different depending on the shape of that user's distribution. Therefore, the latency bound may be the same for all users, but the latency target may be adapted so that the probability of exceeding the latency bound is approximately the same for all users.

In an aspect of the instant disclosure, the scheduler is given a certain degree of control over the latencies of each scheduled packet. This is accomplished by enabling the scheduler to tune, adjust, or control one or more parameters corresponding to components of packet latency, that is, the queuing delay and/or OTA delay.

The amount of time a packet remains in the queue corresponds to its user's priority relative to the other users also waiting to transmit data. Users' priorities are calculated via a priority function, which may be a weighted composition of various factors specific to a user. At a given scheduling opportunity, the scheduler may first schedule users with a high priority, continuing to schedule resources to lower and lower priority users until the scheduler runs out of resources for this given scheduling opportunity. Because users are scheduled until system resources are exhausted, users with higher priority will generally be scheduled before lower priority users, and users with consistently higher priorities will generally see lower average queuing delays. Thus, controlling relative priorities between users enables a degree of control over the queuing delay component of the users' packet latencies.

The amount of time it takes a scheduled packet to be transmitted over the air and successfully decoded at the receiver (i.e., the OTA delay) corresponds to the number of HARQ transmissions it requires to terminate. Each user may have a fixed or variable HARQ target for the number of transmissions required for HARQ termination, and the scheduler may attempt to allocate resources such that the HARQ target is met. In an aspect of the instant disclosure, the scheduler determines one or more characteristics of the transmission signal to attempt to meet the target number of HARQ transmissions. For example, the scheduler may increase the power of the transmission signal, thus increasing the likelihood that the UE will correctly receive the packet in a reduced number of transmissions. In another example, the scheduler may choose a more robust coding scheme or other signal format that similarly increases the likelihood of a correct reception of the packet with fewer transmissions.

Some systems may have a minimum HARQ retransmission interval time of approximately 12 ms, and thus, a user's variable HARQ target can be moved up or down by integer multiples of this time to adjust the distribution of observed OTA delays for that user's packets.

Thus, according to an aspect of the instant disclosure, one or more tuning knobs or latency controllers (e.g., a fine controller to control a user's scheduling priority and a coarse controller to control a user's HARQ target) are introduced for adjusting, regulating, or controlling these constituent delays (i.e., the queuing delay and the OTA delay, respectively). According to another aspect of the instant disclosure, a system is adapted to utilize a latency-centric scheduling technique. That is, these latency controllers at the scheduler may be self-adjusting, utilizing one or more feedback loops that are driven by the history of observed packet latency characteristics of each user.

The latency controllers introduced above may control the latency components, and thus, the overall latency and resulting latency statistics. The feedback loops are utilized to determine changes to the latency controllers to try to approach a target overall latency (whether a statistical mean target or other bound). The target overall latency may be related to the overall latency bound by the distribution of the user's packet latencies. Whether or not performance goals are met can be determined by examining the difference between the overall latency bound and latency history for the user. Then, the performance of a user, in terms of meeting the bound, may be adjusted by adapting a target latency statistic as an intermediary or directly via changing the latency controllers (in either case, the latency bound remains fixed) based on one or more latency histories. For example, a latency history may be a single packet's latency time, a moving average of the latency of a predetermined number of previous packets, a statistic of packet latencies such as a delay value corresponding to a percentage of packet latencies (for example the $95^{th}$ percentile: 95% of packets are received within the delay value), or essentially any function of one or more prior packet latencies. In one aspect of the instant disclosure, there may be a set of one or more latency controllers per user because the variations in delay components may differ between users but the observed latency (a statistic such as mean, or a given percentile of the user's packet latency) is generally collected on a per-user basis. The one or more latency controllers for a particular user may then be adjusted based on statistics observed for that specific user.

In one aspect of the disclosure, one or more latency controllers per user may be adjusted based on a comparison of a latency statistic with the latency bound. For example, the latency statistic may be a percentage of packets that exceed the latency bound. Here, if a given portion of a particular user's packets, e.g., ≥5%, have a latency that exceeds the latency bound, the one or more latency controllers may be adjusted (e.g., by increasing the user's priority or lowering the user's HARQ target) to suitably reduce the predicted latency of future packets to achieve an acceptably low number of packets that fail to meet the latency bound. Likewise, if less than 5% of the user's packets have a latency that exceeds the latency bound, the one or more latency controllers may be adjusted to suitably increase the predicted latency of future packets to reduce the resources allocated to that user and enable a higher overall system capacity.

In another aspect of the disclosure, the one or more latency controllers per user may be adjusted based on a comparison of a first latency statistic with a latency target, wherein the latency target is a floating target, adjusted as an intermediary step based on a comparison of a second latency statistic with the latency bound. For example, the first latency statistic may be a function of the user's packet latency history, e.g., $|f(L-T)|$, where L is a particular packet's latency, T is the current value of the floating latency target, and $f(\ )$ is a moving average function of the difference between L and T over a number of previous packets. Here, if the value of $|f(L-T)|$ is greater than a given threshold, the one or more latency controllers may be adjusted to suitably adjust the predicted latency of future packets to achieve a latency statistic at or near the latency target value. Moreover, the second latency statistic may be a percentage of packets that exceed the latency bound. Here, if a given portion of a particular user's packets, e.g., 5%, have a latency that exceeds the latency bound, the floating latency target may be reduced, and likewise if less than 5% of the user's packets have a latency that exceeds the latency bound the floating latency target may be increased.

The latency history is utilized because it provides a relatively good indication of whether a user is in an area of poor signal quality, requiring more system resources to meet their latency requirements. In an example having a combination of these loops that work in conjunction, the overall effect, over time, is the identification of users with adverse channel conditions and the direction of increased scheduler priority and/or additional power/code resources to those users. The one or more feedback loops enable dynamic adjustment of latency targets such that the steady state result is to balance users' performance with respect to their outage criteria. That is, the observed effect is that packet latency profiles of individual users are reshaped in a way that reflects a more efficient usage of system resources, thus increasing the number of users meeting their latency requirements.

Referring once again to the timeline of FIG. 6 and the block diagram of FIG. 5, in an aspect of the instant disclosure, the latency calculation and filtered metric computation block 541 compares the observed total latency L corresponding to a function of one or more finished vocoder packets (whether successful or unsuccessful) to a target latency value, T. The difference L−T is utilized to drive the latency controllers 522 and/or 542.

That is, the latency calculation and filtered metric computation block 541 may look at a particular user's packets and take samples of packet latency for that user's packets as an input to drive feedback that influences the latency of the user's future packets. The latencies of prior packets and their performance relative to the latency target are utilized to determine the loop's feedback response. As previously described, the latency of a packet includes a queuing delay and an OTA delay, and either one or both may be adjusted to influence the final packet latency. In the instant disclosure, adjustments to scheduling priority (and hence queuing delay) are referred to as fine latency control, and adjustments to the HARQ target (and hence OTA delay) are referred to as coarse latency control.

In an aspect of the instant disclosure, the latency controller or controllers for each user are updated after vocoder packets are finished, and the action taken by the loop is taken into account by the next scheduling TTI for that user. Likewise, adjustments of the latency controllers may be implemented at less frequent intervals, for example every two or ten TTIs, etc. The calculated value of the observed packet latency's difference from the target time, L–T, may be utilized to drive the coarse and/or fine adjustments. Whether to make a coarse adjustment or a fine adjustment may be decided on by either the magnitude of L–T or some sample filtered version of it.

Figure 7:
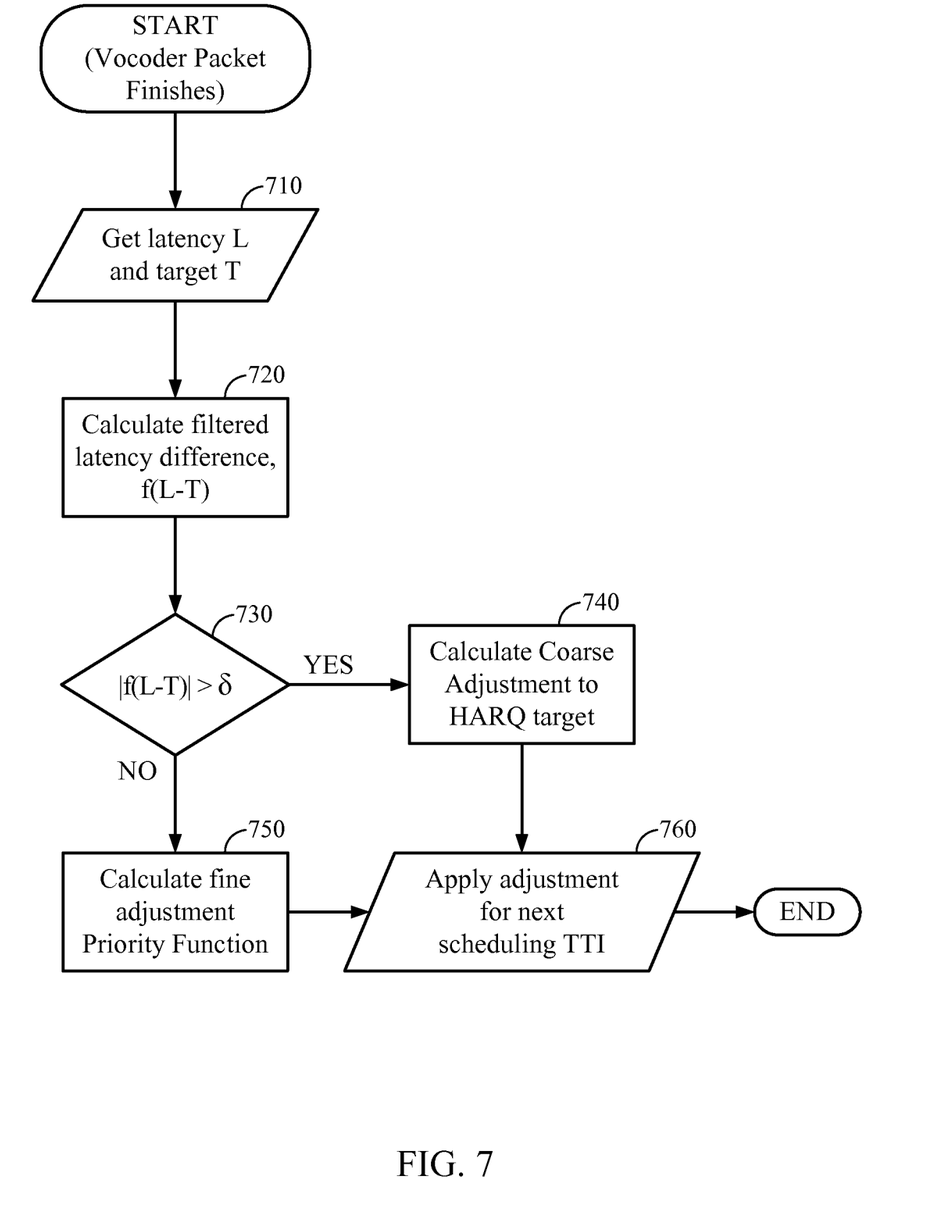
FIG. 7 is a flow chart illustrating a process according to an aspect of the disclosure.

FIG. 7 is a flow chart illustrating a process of adjusting a latency target in response to either the magnitude of L–T or some sample filtered version of it, according to an aspect of the instant disclosure. In some cases, the process may be performed by a processor coupled to a memory for storing instructions to be executed by the processor. In some cases, the process may be performed by an application specific integrated circuit, a programmable gate array, or a digital signal processor. In some cases, the process may be performed by the scheduler illustrated in FIG. 5.

The illustrated process starts when a HARQ termination signal such as ACK/NACK X43 is received, e.g., by the HARQ handling unit 540 from a UE. In block 710, the process obtains the latency L of the packet and the latency target T. The latency L of the packet may correspond to the time between the scheduling of the packet by the resource allocation unit 530, and the receipt of the ACK/NACK by the HARQ handling unit 540. The target latency T may correspond to the latency target for the just-completed TTI.

In block 720, the process calculates a statistic of a difference between the latency and the latency target, that is, a filtered latency difference f(L–T). As discussed above, in some aspects of the instant disclosure, when the latency target is a floating target, such as a particular latency of, for example, 50 ms (subject to adjustment), the statistic f(L–T) may be filtered with a suitable IIR or FIR filtering operation, for example, a moving average, to control the operation's sensitivity to short term latency fluctuations. In another aspect of the instant disclosure, the filtered latency difference may include a filter that determines a percentage or portion of previous packets that exceed the latency bound.

In block 730, the process compares the statistic |f(L–T)| with the value of δ. Here, δ corresponds to a threshold, which may be a predetermined threshold, utilized to determine whether a larger, coarse adjustment to the HARQ target is desired, or whether a more granular, fine adjustment to the priority function will suffice. An appropriate choice of δ may be 12 ms, which is the minimum HARQ retransmission interval in HSDPA, but other suitable values may be chosen for increased or decreased sensitivity.

If the process determines in block 730 that the filtered value of L–T is greater than δ ms, the process branches to block 740 and performs the coarse adjustment to the HARQ target. That is, the coarse adjustment may be utilized to adjust the HARQ target for earlier or later terminations. For example, if the filtered value of L–T is greater than δ ms, the HARQ target is decremented or moved to target termination one transmission earlier, if not already targeting the 1st transmission. If the filtered value is less than −δ ms, the target termination is incremented or moved to one transmission later, if not already targeting the maximum allowable number of transmissions. In pseudocode, this calculation of the coarse adjustment to the HARQ target may be represented as:

if $f(L-T) > 12$ ms AND $HARQ_{target} > 1$, $HARQ_{target} = HARQ_{target} - 1$;

else if $f(L-T) \leq -12$ ms AND $HARQ_{target} < HARQ_{target, max}$, $HARQ_{target} = HARQ_{target} + 1$;

else (make Fine Adjustment).

If the process determines in block 730 that the filtered value of L–T is less than δ ms, the process branches to block 750 and performs the fine adjustment to the priority function. That is, the fine adjustment to the priority function may effectively give users higher or lower priority based on whether f(L–T)>0 or f(L–T)<0. Alternately, instead of 0, comparisons to ϵ or −ϵ, where ϵ is any suitable value, may be used if a hysteresis is desired. For a user u at a scheduling TTI n, a generalized priority function P(u, n) may take the form:

$$P(u,n) = S(u,n) \cdot C(u,n),$$

Where the priority depends on a queuing delay sensitive component, S(u, n), and a channel sensitive component C(u, n). Other, additional components may contribute to a given user's priority, and those skilled in the art will comprehend that additional factors may be included within the scope of this disclosure.

The channel sensitive component C(u, n) may depend on channel condition information 533. In some examples, channel condition information 533 may be provided by the user equipment, for example, in the form of a channel quality indicator (CQI).

The queuing delay sensitive component S(u, n) may be the latency controller for controlling the queuing delay component of each user's packet latency. That is, the fine adjustment loop increases the magnitude of this component for users that have been facing persistently high latencies, and decreases it for users not currently facing latency problems. In effect, it amplifies or suppresses the channel sensitivity factor in a priority determination for that user, relative to other users.

One possible way to define S(u, n) and its update process is as follows:

$$S(u, n+1) = \begin{cases} S(u,n) \cdot 10^{\frac{\Delta_{up}}{10}} & f(d) > 0 \\ S(u,n) \cdot 10^{\frac{-\Delta_{down}}{10}} & f(d) < 0 \end{cases}$$

where the queuing delay sensitive component S is updated for the next scheduling TTI (n+1) by some dB-sized step up or down from the current value S(u, n). The sizes of the up and down steps, $\Delta_{up}$ and $\Delta_{down}$, may be chosen to be of the same or of different sizes and ratios, depending on what kind of distribution around the latency target T is desired.

After the coarse or fine adjustments are calculated in block 740 or 750, respectively, in block 760 the process applies the appropriate adjustment for the next scheduling TTI, that is, TTI number n+1.

Figure 8:
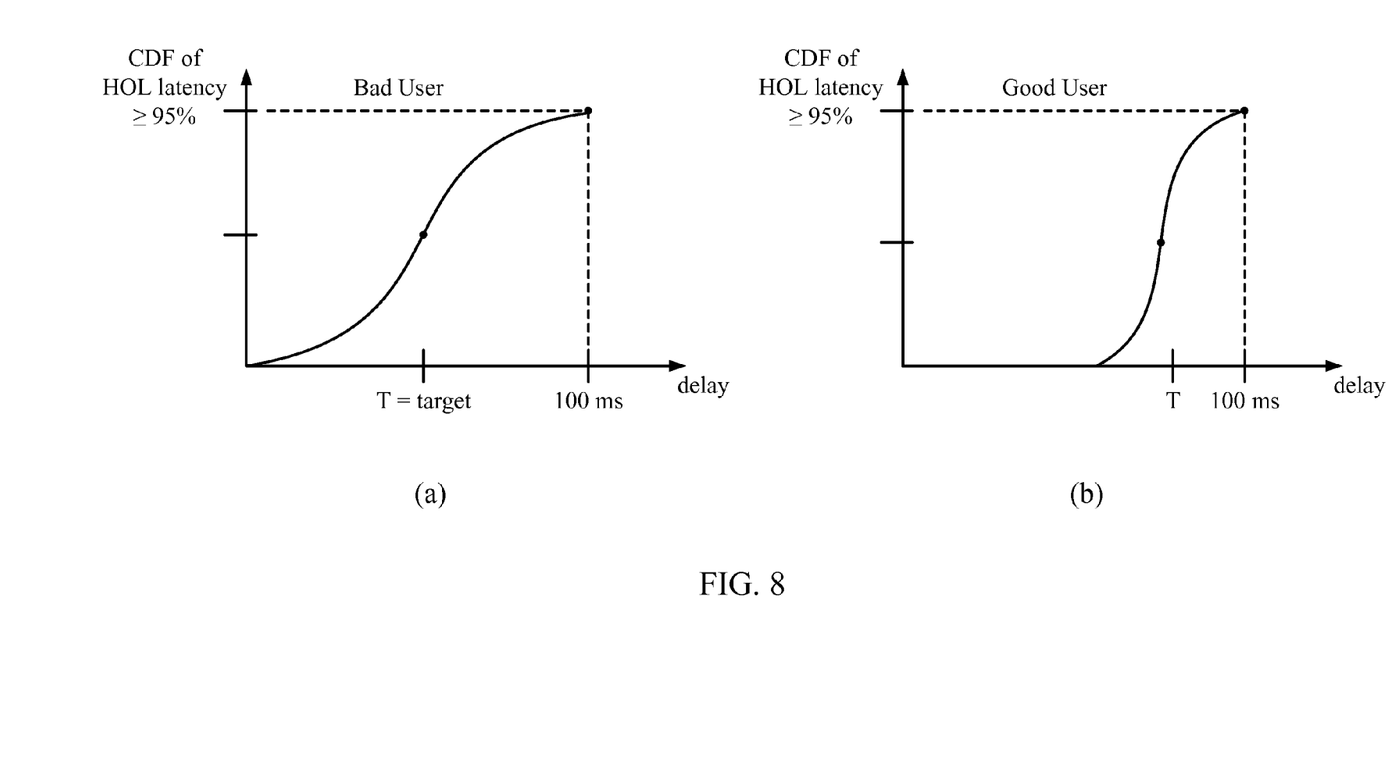
FIGS. 8(a) and 8(b) are a charts illustrating exemplary packet latency distributions.

FIG. 8 shows a pair of cumulative distribution functions illustrating the distribution of packet latency for a "bad" user, in FIG. 8(a), and for a "good" user, in FIG. 8(b). A "bad" user may be a user in an area having poor and/or inconsistent channel conditions, near an edge of a cell, etc. Under such conditions, the number of HARQ transmissions may vary, causing the variability of the packet latency for packets transmitted to the bad user may be large, resulting in a wide distribution. A "good" user may be a user in an area with relatively robust channel conditions, or where the channel is predicted to become good in a short amount of time. Here, data packets are likely to be reliably received by the user, and thus, the distribution of packet latencies may be narrow.

In an exemplary aspect of this disclosure, a target latency T is set according to the profile of the user, e.g., as a good or bad user as illustrated in FIG. 8. That is, the distribution of actual, measured latency for packets over time is generally distributed around the target time, where the target latency is controlled as described above, by utilizing a coarse adjustment to the HARQ target and/or a fine adjustment to the scheduling priority.

Thus, if a user's packet latency distribution is wide, such as for the bad user illustrated in FIG. 8(a), the target latency may be set to a lower time. In this way, although the latency distribution is wide, it may still be possible for most of the packets to be received successfully by the UE, e.g., ≥95% of the packets being received and acknowledged by 100 ms. Likewise, if a user's packet latency distribution is narrow, such as the good user, illustrated in FIG. 8(b), the target latency may be set to a higher time. In this way, although the target is relatively close to the limit of e.g., 100 ms, most of the user's packets may be received successfully by the UE, e.g., ≥95% of the packets, by that limit of 100 ms.

Because system resources are limited, it may be advantageous to allocate the minimum amount of resources to each user to just barely meet those specified call quality criteria. In this way, the number of users can be maximized within the system.

That is, packets associated with "better" users may be delayed to the point of causing them a greater number of packet errors, but not so far as to cause the error rate to go beyond an acceptable threshold for those users. In this way, system resources are freed up to be allocated to other users who may need them more.

In an aspect of this disclosure, the feedback loop may dynamically adapt the target latency in accordance with the history of packet latencies. That is, a particular user may be more like the bad user of FIG. 8(a) at one time, and later may appear more like the good user of FIG. 8(b). Here, a scheduler according to this aspect of the disclosure may dynamically adjust the target latency over time to be later in time, thus, freeing up system resources to be utilized by other users who may need them more.

Figure 9:
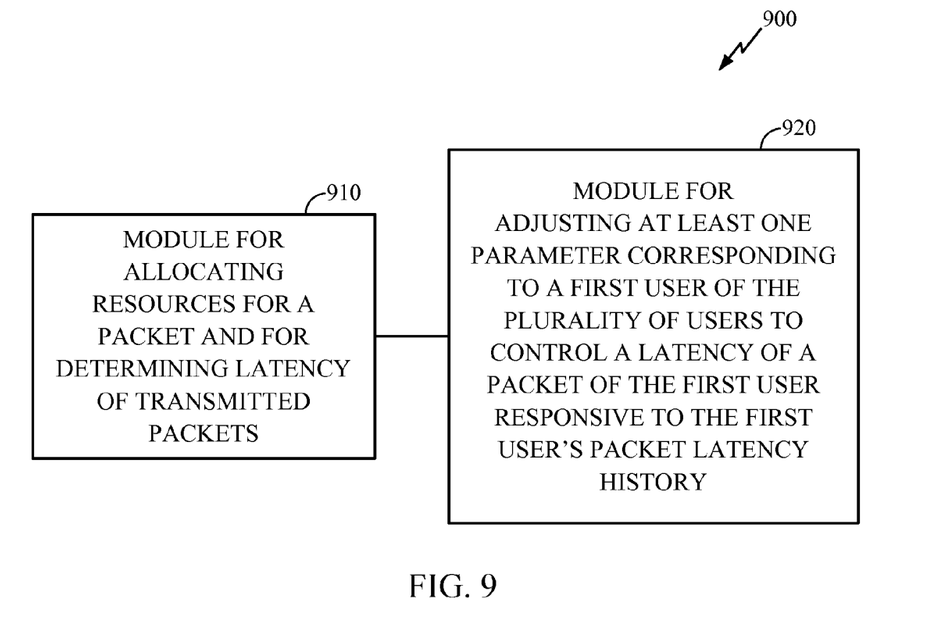
FIG. 9 is a diagram illustrating the functionality of a scheduler in accordance with an aspect of the disclosure.

FIG. 9 is a diagram illustrating the functionality of a scheduling apparatus 900 in accordance with an aspect of the disclosure. The apparatus 900 includes a module 910 for allocating resources for a packet, and for determining the latency of transmitted packets, and a module 920 for adjusting a latency target for a packet responsive to a user's packet latency history.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for allocating system resources to a plurality of users of a wireless network, the method comprising:
receiving a hybrid automatic repeat request (HARQ) termination signal from a first user of the plurality of users in response to a packet;
determining a packet latency value and a packet latency target based on the HARQ termination signal and the packet;
calculating a packet latency history, wherein the packet latency history corresponds to a filtered latency difference based on the packet latency value and the packet latency target; and
adjusting a HARQ target corresponding to the first user to control a latency of the packet based on packet latency history, wherein the HARQ target corresponds to a target number of transmissions required for HARQ termination.

2. The method of claim 1, wherein the packet comprises a VoIP packet.

3. The method of claim 1, wherein the packet latency history comprises a percentage of packets having latencies less than a latency bound, the latency bound being a maximum allowable latency for a predetermined portion of packets of the first user.

4. The method of claim 1, wherein the packet latency history comprises a statistic of a difference between the packet latency value and the packet latency target.

5. The method of claim 4, wherein the packet latency target comprises a targeted latency for future packets, the targeted latency being less than a latency bound, the latency bound being a maximum allowable latency for a predetermined portion of packets of the first user.

6. The method of claim 5, further comprising:
increasing the packet latency target when the statistic is less than a first predetermined threshold, and
decreasing the packet latency target when the statistic is greater than a second predetermined threshold.

7. The method of claim 6, wherein the first and second predetermined thresholds respectively comprise percentages of packets having latencies less than the latency bound.

8. The method of claim 7, wherein the first and second predetermined thresholds are each 95%.

9. The method of claim 1, wherein the packet latency history comprises a statistic of a time period between a time that at least one previous packet is received by a scheduler and a time that the HARQ termination signal corresponding to the packet is received.

10. The method of claim 9, further comprising adjusting a scheduling priority associated with the first user to further control the latency of the packet based on the packet latency history of the first user.

11. The method of claim 10, wherein the adjusting of the scheduling priority comprises changing the scheduling priority when an amplitude of the statistic is greater than a predetermined threshold.

12. The method of claim 10, wherein the scheduling priority associated with the user u at a transmission time interval n is dependent on a queuing delay sensitive component S(u, n), and the adjusting of the scheduling priority for transmission time interval n+1 comprises:

$$S(u, n+1) = \begin{cases} S(u, n) \cdot 10^{\frac{\Delta_{up}}{10}} & f(L-T) > 0 \\ S(u, n) \cdot 10^{\frac{-\Delta_{down}}{10}} & f(L-T) < 0 \end{cases},$$

wherein $\Delta_{up}$ comprises a priority increasing factor and $\Delta_{down}$ comprises a priority decreasing factor, wherein u, n, $\Delta_{up}$, $\Delta_{down}$ are each positive values, and wherein L is a latency of the at least one previous packet, T is a value of a latency target, and f( ) is a function of the difference between L and T over a number of previous packets.

13. The method of claim 9, wherein the adjusting of the HARQ target comprises adjusting the HARQ target for the packet of the first user when an amplitude of the statistic is greater than a first predetermined threshold.

14. The method of claim 13, wherein the adjusting of the HARQ target for the packet of the first user comprises adjusting a transmitted signal power to control a likelihood that a user equipment (UE) receives the packet.

15. The method of claim 13, wherein the adjusting of the HARQ target for the packet of the first user comprises modifying a signal format to control a likelihood that a user equipment (UE) receives the packet.

16. The method of claim 15, wherein the modifying of the signal format comprises modifying a coding scheme.

17. The method of claim 13, wherein the adjusting of the HARQ target comprises:
decrementing the HARQ target when the statistic is greater than a minimum HARQ retransmission interval and the HARQ target is not already targeting a first transmission; and
incrementing the HARQ target when the statistic is less than a negative of the minimum HARQ retransmission interval and the HARQ target is not already targeting a maximum allowed number of transmissions.

18. The method of claim 17, wherein the adjusting of the packet latency target further comprises adjusting a scheduling priority associated with the first user within the scheduler when the amplitude of the statistic is greater than a second predetermined threshold.

19. The method of claim 1, wherein the adjusting of the HARQ target is independent of any adjustment to a maximum allowed number of transmissions.

20. An apparatus for wireless communication, comprising:
means for receiving a hybrid automatic repeat request (HARQ) termination signal from a first user of a plurality of users in response to a packet;
means for determining a packet latency value and a packet latency target based on the HARQ termination signal and the packet;
means for calculating a packet latency history, wherein the packet latency history corresponds to a filtered latency difference based on the packet latency value and the packet latency target; and
means for adjusting a HARQ target corresponding to the first user to control a latency of the packet based on the packet latency history, wherein the HARQ target corresponds to a target number of transmissions required for HARQ termination.

21. The apparatus of claim 20, wherein the packet comprises a VoIP packet.

22. The apparatus of claim 20, wherein the packet latency history comprises a percentage of packets having latencies less than a latency bound, the latency bound being a maximum allowable latency for a predetermined portion of packets of the first user.

23. The apparatus of claim 20, wherein the packet latency history comprises a statistic of a difference between the packet latency value and the packet latency target.

24. The apparatus of claim 23, wherein the packet latency target comprises a targeted latency for future packets, the targeted latency being less than a latency bound, the latency bound being a maximum allowable latency for a predetermined portion of packets of the first user.

25. The apparatus of claim 24, further comprising:
means for increasing the packet latency target when the statistic is less than a first predetermined threshold, and
means for decreasing the packet latency target when the statistic is greater than a second predetermined threshold.

26. The apparatus of claim 25, wherein the first and second predetermined thresholds respectively comprise percentages of packets having latencies less than the latency bound.

27. The apparatus of claim 26, wherein the first and second predetermined thresholds are each 95%.

28. The apparatus of claim 20, wherein the packet latency history comprises a statistic of a time period between a time that at least one previous packet is received by a scheduler and a time that the HARQ termination signal corresponding to the packet is received.

29. The apparatus of claim 28, further comprising means for adjusting a scheduling priority associated with the first user to further control the latency of the packet based on the packet latency history of the first user.

30. The apparatus of claim 29, wherein the means for adjusting the scheduling priority comprises means for changing the scheduling priority when an amplitude of the statistic is greater than a predetermined threshold.

31. The apparatus of claim 28, wherein the adjusting of the HARQ target comprises adjusting the HARQ target for the packet of the first user when an amplitude of the statistic is greater than a first predetermined threshold.

32. The apparatus of claim 31, wherein the scheduling priority associated with the user u at a transmission time interval n is dependent on a queuing delay sensitive component S(u, n), and the means for adjusting the scheduling priority for transmission time interval n+1 comprises:

$$S(u, n+1) = \begin{cases} S(u, n) \cdot 10^{\frac{\Delta_{up}}{10}} & f(L-T) > 0 \\ S(u, n) \cdot 10^{\frac{-\Delta_{down}}{10}} & f(L-T) < 0 \end{cases},$$

wherein $\Delta_{up}$ comprises a priority increasing factor and $\Delta_{down}$ comprises a priority decreasing factor, wherein u, n, $\Delta_{up}$, $\Delta_{down}$ are each positive values, and wherein L is a latency of the at least one previous packet, T is a value of a latency target, and f( ) is a function of the difference between L and T over a number of previous packets.

33. The apparatus of claim 31, wherein the adjusting of the HARQ target for the packet of the first user comprises adjusting a transmitted signal power to control a likelihood that a user equipment (UE) receives the packet.

34. The apparatus of claim 31, wherein the means for adjusting the HARQ target for the packet of the first user comprises modifying a signal format to control a likelihood that a user equipment (UE) receives the packet.

35. The apparatus of claim 34, wherein the means for modifying the signal format comprises means for modifying a coding scheme.

36. The apparatus of claim 31, wherein the means for adjusting the HARQ target comprises:
means for decrementing the HARQ target when the statistic is greater than a minimum HARQ retransmission interval and the HARQ target is not already targeting a first transmission; and
means for incrementing the HARQ target when the statistic is less than a negative of the minimum HARQ retransmission interval and the HARQ target is not already targeting a maximum allowed number of transmissions.

37. The apparatus of claim 36, wherein the means for adjusting the packet latency target further comprises means for adjusting a scheduling priority associated with the first user within the scheduler when the amplitude of the statistic is greater than a second predetermined threshold.

38. An apparatus for allocating system resources to a plurality of users of a wireless network, comprising:
a processing system configured to:
receiving a hybrid automatic repeat request (HARQ) termination signal from a first user of the plurality of users in response to a packet;
determining a packet latency value and a packet latency target based on the HARQ termination signal and the packet;
calculating a packet latency history, wherein the packet latency history corresponds to a filtered latency difference based on the packet latency value and the packet latency target; and
adjusting a HARQ target corresponding to the first user to control a latency of the packet based on the packet latency history, wherein the HARQ target corresponds to a target number of transmissions required for HARQ termination.

39. The apparatus of claim 38, wherein the packet comprises a VoIP packet.

40. The apparatus of claim 38, wherein the packet latency history comprises a percentage of packets having latencies less than a latency bound, the latency bound being a maximum allowable latency for a predetermined portion of packets of the first user.

41. The apparatus of claim 38, wherein the packet latency history comprises a statistic of a difference between the packet latency value and the packet latency target.

42. The apparatus of claim 41, wherein the packet latency target comprises a targeted latency for future packets, the targeted latency being less than a latency bound, the latency bound being a maximum allowable latency for a predetermined portion of packets of the first user.

43. The apparatus of claim 42, wherein the processing system is further configured to:
increase the packet latency target when the statistic is less than a first predetermined threshold, and
decrease the packet latency target when the statistic is greater than a second predetermined threshold.

44. The apparatus of claim 43, wherein the first and second predetermined thresholds respectively comprise percentages of packets having latencies less than the latency bound.

45. The apparatus of claim 44, wherein the first and second predetermined thresholds are each 95%.

46. The apparatus of claim 38, wherein the packet latency history comprises a statistic of a time period between a time that at least one previous packet is received by a scheduler and a time that the HARQ termination signal corresponding to the packet is received.

47. The apparatus of claim 46, further comprising adjusting a scheduling priority associated with the first user to further control the latency of the packet based on the packet latency history of the first user.

48. The apparatus of claim 47, wherein the adjusting of the scheduling priority comprises changing the scheduling priority when an amplitude of the statistic is greater than a predetermined threshold.

49. The apparatus of claim 47, wherein the scheduling priority associated with the user u at a transmission time interval n is dependent on a queuing delay sensitive component S(u, n), and the adjusting of the scheduling priority for transmission time interval n+1 comprises:

$$S(u, n+1) = \begin{cases} S(u, n) \cdot 10^{\frac{\Delta_{up}}{10}} & f(L-T) > 0 \\ S(u, n) \cdot 10^{\frac{-\Delta_{down}}{10}} & f(L-T) < 0 \end{cases},$$

wherein $\Delta_{up}$ comprises a priority increasing factor and $\Delta_{down}$ comprises a priority decreasing factor, wherein u, n, $\Delta_{up}$, $\Delta_{down}$ are each positive values, and wherein L is a latency of the at least one previous packet, T is a value of a latency target, and f( ) is a function of the difference between L and T over a number of previous packets.

50. The apparatus of claim 46, wherein the adjusting of the HARQ target comprises adjusting the HARQ target for the packet of the first user when an amplitude of the statistic is greater than a first predetermined threshold.

51. The apparatus of claim 50, wherein the adjusting of the HARQ target for the packet of the first user comprises adjusting a transmitted signal power to control a likelihood that a user equipment (UE) receives the packet.

52. The apparatus of claim 50, wherein the adjusting of the HARQ target for the packet of the first user comprises modifying a signal format to control a likelihood that a user equipment (UE) receives the packet.

53. The apparatus of claim 52, wherein the modifying of the signal format comprises modifying a coding scheme.

54. The apparatus of claim 50, wherein the adjusting of the HARQ target comprises:

decrementing the HARQ target when the statistic is greater than a minimum HARQ retransmission interval and the HARQ target is not already targeting a first transmission; and incrementing the HARQ target when the statistic is less than a negative of the minimum HARQ retransmission interval and the HARQ target is not already targeting a maximum allowed number of transmissions.

55. The apparatus of claim 54, wherein the adjusting of the packet latency target further comprises adjusting a scheduling priority associated with the first user within the scheduler when the amplitude of the statistic is greater than a second predetermined threshold.

* * * * *